United States Patent [19]
Barber

[11] Patent Number: 6,157,917
[45] Date of Patent: *Dec. 5, 2000

[54] BANDWIDTH-PRESERVING METHOD OF CHARGING FOR PAY-PER-ACCESS INFORMATION ON A NETWORK

[76] Inventor: Timothy P. Barber, 11931 Chalon La., San Diego, Calif. 92128

[*] Notice: This patent issued on a continued prosecution application filed under 37 CFR 1.53(d), and is subject to the twenty year patent term provisions of 35 U.S.C. 154(a)(2).

[21] Appl. No.: 08/893,503

[22] Filed: Jul. 11, 1997

[51] Int. Cl.⁷ ..................................................... G06F 17/60
[52] U.S. Cl. ................................................. 705/26; 705/65
[58] Field of Search ................................. 705/27, 26, 65, 705/66; 395/200.47, 200.48; 350/24; 380/24

[56] References Cited

U.S. PATENT DOCUMENTS

| | | | |
|---|---|---|---|
| 5,692,132 | 11/1997 | Hogan | 705/40 |
| 5,708,780 | 1/1998 | Levergood et al. | 709/229 |
| 5,715,314 | 2/1998 | Payne et al. | 380/24 |
| 5,724,424 | 3/1998 | Gifford | 705/79 |
| 5,774,670 | 6/1998 | Montulli | 395/200.57 |
| 5,802,497 | 9/1998 | Manasse | 705/27 |
| 5,812,769 | 9/1998 | Graber et al. | 395/200.48 |
| 5,930,777 | 7/1999 | Barber | 705/40 |

OTHER PUBLICATIONS

Chris A. Owen, "Internet Micro–payment Protocols", May 1997, IDS Submission, p. 7.

Larry Budnick, Windows NT Web Server Book Tools & Techniques For Building An Internet/Intranet Site, 1996, EIC–Library, pp. 85–86.

David A.Taylor, Object–Oriented Information Systems Planning and Implementation, 1992, EIC–Library, pp. 19–34.

"SubScrip—An efficient protocol for per–per–view payments on the Internet," Andreas Furche & Graham Wrightson, Dept. of Computer, Science, U. of Newcastle, Oct. 16, 1996, pp. 1–5.

"PayWord and MicroMint: Two simple micropayment schemes," Ronald L. Rivest* and Adi Shamir**, *MIT Laboratory for Computer Science, **Weizmann Institute of Science, May 7, 1996, pp. 1–18.

(List continued on next page.)

*Primary Examiner*—Emanuel Todd Voeltz
*Assistant Examiner*—Thomas A. Dixon
*Attorney, Agent, or Firm*—Ware, Fressola, Van Der Sluys & Adolphson LLP

[57] ABSTRACT

A method for charging a payer for access, over a network, to a payee's information; in particular, a method for this pay-per-access over the Internet. The method uses an acquirer to intercept requests for information, process accounting information based on the payer having a signed, encrypted persistent dynamic data object available to the acquirer for inspection and modification. After using the persistent dynamic data object, similar in some respects to a so-called cookie, to collect payment for a page of pay-per-link information, the acquirer redirects the payer to the information at the payee's web site. The cookie-like object is issued to the payer by an issuer, which can be distinct from the acquirer. The cookie-like object can be used until its value is spent or until its lifetime elapses. Thus, a payer has a limited amount to spend without having to obtain authorization for each purchase, yet a payee does not risk a payer's double spending. Ultimately, the acquirer sends accounting records to the various issuers; each issuer settles with its various payers and, through the acquirers, also pays the payees.

11 Claims, 2 Drawing Sheets

OTHER PUBLICATIONS

"iKP—A Family of Secure Electronic Payment Protocols," IBM Research, Mar. 1995 pp. 1–17.

"Mini–Pay: Charging per Clickon the Web," IBM Research––Haifa Research Lab–Tel–Aviv Annex Apr. 10, 1997, pp. 1–20.

"Millicent: Frequently Asked Questions," Apr. 15, 1997, pp. 1–3.

"Millicent–specific elements for an HTTP payment protocol," Apr. 15, 1997, pp 1–8.

"Internet Micro–payment Protocols," by Chris A. Owen, date unkown.

Downloaded information from "Cookie Central" website on the Internet, downloaded May 30, 1997.

"Micropayment Schemes Promise to Make the Web Profitable—One Penny at a Time," by Eric Brown, NewMedia, Jun. 23, 1997, pp 1–7.

BANDWIDTH-PRESERVING METHOD OF CHARGING FOR PAY-PER-ACCESS INFORMATION ON A NETWORK

BACKGROUND OF THE INVENTION

1. Technical Field

The present invention pertains to the field of charging a fee for information provided over a network. More particularly, the present invention pertains to a method of handling access to information over the Internet in a way that makes feasible a quite small charge per access, and does not require the payer to have an account with the information provider.

2. Description of Related Art

There are now a number of methods that have been proposed for handling what are termed micro-payments on the Internet, i.e. payments for purchases made over the Internet. Often, as here, the term micro-payment is specialized to refer to payment for information accessed over the Internet. The designation micro-payment is used to indicate that the cost of each purchase may be as low as a small fraction of the smallest denomination of scrip in many countries, e.g. a tenth of a US penny or less.

In a May, 1997, survey of sixteen methods providing for paying for access to information over the Internet, Chris A. Owen, in his article entitled, "Internet Micro-payment Protocols," describes how the existing methods make various compromises trying to satisfy the various conflicting goals of good security, high transaction volume capacity, low transaction cost, and high transaction speed. None are stated as having achieved a superior result in the mix of these goals because of the entities the methods employ, and the roles assigned to each entity.

What is still needed is a method of charging for each access to information in a way that is secure but fast, and that keeps overhead low. One way to do this is to distribute the work involved in providing the requested information, recording the accounting details of a purchase, and then settling between the payee and payer for the purchase.

SUMMARY OF THE INVENTION

The present invention is disclosed here using terminology that is the same as used in the survey article by Owen. The term issuer will indicate a service that manages a payer database. The term acquirer will indicate a network based service that manages pay-per-link transactions for one or more issuers. The term payer will indicate a network user, either a person or a computer program, that retrieves pay-per-link information from a network site. The term payee will indicate an owner or manager of network-accessible pay-per-link information.

The present invention is a bandwidth preserving method of providing for payment for information over a network using a distributed approach, in that aggregation of payments and the issuing of means of payment are performed by two separate entities: an acquirer and an issuer. In this approach the acquirer stores and retrieves sometimes encrypted information about a payer's account on the payer's machine.

The storing of information on a remote computer for various purposes including its later retrieval is old in the art; the information so stored is commonly referred to as a "cookie": a persistent data object of limited size and lifetime that can be retrieved by the server when the payer's browser visits the server again later. A cookie is said to be persistent in that it cannot be modified by the payer, only the server. More generally, a cookie is defined as any data object that can be transferred from server to client that the server can later retrieve and that the client cannot modify.

In the present invention, however, when a payer's browser retrieves a page from a server of either a payee or an acquirer via hypertext transfer protocol (http), the standard protocol used to retrieve and view Web documents, the server will often pass what is here called an intelligent cookie to the payer's browser, the intelligent cookie holding various dynamic information, including a limit to the spending of the cookie owner. The cookie is intelligent in that it is a signed, encrypted, persistent, dynamic data object, and is securely transferable and modifiable by various acquirers at different sites on the network (but not modifiable by payers).

In the present invention a payer, after being issued an intelligent cookie from an issuer, can purchase information from any payee who has an account with any compatible acquirer, i.e. one that cooperates with the issuer. It is by providing for automatic redirecting between different acquirers that the present invention allows for transactions to be handled by any compatible acquirer. Further, the present invention allows the payer to reuse a cookie until its purchasing power is depleted, or until the cookie is older than its allowed lifetime; this allowing for multiple bites of a cookie saves network resources, both communication bandwidth and data-access costs.

When a payer has an intelligent cookie and wants to make a pay-per-link purchase, he clicks on a pay-for link at the web site of a payee. The payee will have pre-configured the pay-for link to redirect the payer to the payee's acquirer. The acquirer will "nibble" the intelligent cookie, meaning that the acquirer will decode the object, extract the necessary accounting information about the payer, refer to a link reference page to get the information about the pay-per-link information the payer wants to purchase, record the transaction in an aggregation of transactions, depreciate the purchasing power of the object, recode it as an intelligent cookie, and reset it in the payer's browser. Then the acquirer will redirect the payer's browser to the pay-per-link information corresponding to the pay-for link the payer selected.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
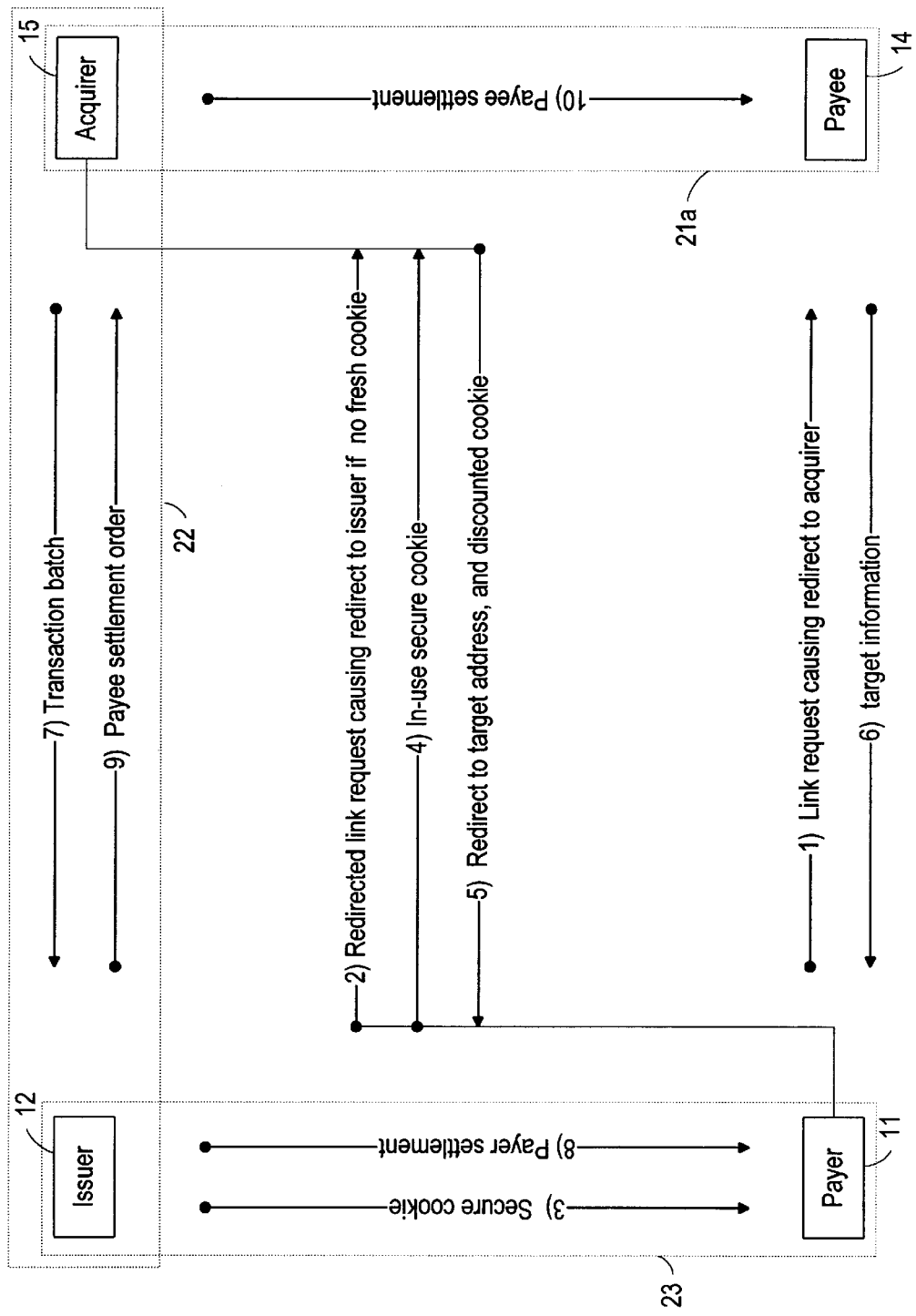
FIG. 1 is a transaction diagram for pay-per-access according to the present invention where the payer has an account with an issuer the acquirer uses too.

The preferred embodiment of the present invention is as a method for paying for access to information over the Internet via the World Wide Web (WWW or Web). The present invention, however, is suitable for use in any network. In particular, the present invention, because it relies only on network addresses, which exist in any network, is not restricted to use on a network that allows what on the Web are called browsers. Thus, the present invention can be used on the Internet with autonomous information search and retrieval engines, which do not use a human-interface browser.

Additional Terminology

In this description, a document is a page of information that a payee charges to access; and a document is located at a Web site, usually, but not necessarily, that of the payee charging for access to the document. A page at a Web site can bear information for which a charge is made, or can serve other purposes, such as presenting to a payer a menu from which to select a document.

In addition to the terminology specific to the present invention, this description uses some standard terminology associated with Web documents and transport protocols. Hypertext markup language (html) is a format used by most documents on the World Wide Web. A uniform resource locator (URL) is a Web address; it uniquely identifies the location of a particular document (information-bearing page) on the network. Hypertext transfer protocol (http) is the standard protocol used to retrieve and view Web documents. A common gateway interface (cgi) is a Web object that, when referenced, executes a program at a destination address and returns some data or a program-generated html document. An extended URL (also called a cgi-extended URL) is a Web address that is said to be extended because of having data used as input by a cgi program at a destination address. An example of an extended URL is website?data=3991772391

In the present invention, a payer uses an intelligent cookie to, pay for pay-per-link purchases. The term intelligent cookie is used here to refer to a persistent (not modifiable by a payer) dynamic data object that is authenticated, enciphered, and securely transferable among, and modifiable by multiple acquirers across a network. An intelligent cookie is securely transferable by virtue of the specific information it conveys and the format of this information. Most importantly for the present electronic banking application, the data and its format stored in an intelligent cookie of the present invention is particularized for chaining authorizations together without sacrificing security, thus bypassing traditional purchaser authorization.

An intelligent cookie encodes, among other data, an updated off-line credit limit—essentially the amount of money the payer can spend without having to get further authorization. This figure is adjusted downward (by an acquirer) each time the payer makes a purchase, until the intelligent cookie is fully eaten (has an off-line credit limit of essentially zero) or is stale (is older than an allowed lifetime). Additionally, in the present invention, this adjusting downward is done by possibly different acquirers as the payer moves from the Web site of one payee to that of another, who may use a different acquirer, but one that can still digest the intelligent cookie, i.e., is able to authenticate it, interpret it, and modify it.

Thus, the use of an intelligent cookie frees the issuer from making costly real-time accesses to its payer database. The ability of the payer's computer to accept and retain cookies can be a feature of a payer's browser in the case of use of the present invention on the Internet, or as part of some plug-in application in the case of either use on the World Wide Web, or more generally, as a feature of any interactive or autonomous program that seeks to retrieve information from another site on a communications network.

Setting Up Accounts and the Primary Acquirer

Referring now to FIG. 1, in the present invention, a payer 11 opens an account with an issuer 12 using for example a credit card to deposit some money into the account. A payee 14 opens an account with an acquirer 15, using some secure means, and provides the acquirer with the location of the information the payee wishes to sell, along with possibly some other data in connection with the pay-per-link information. The acquirer issues the payee a unique identification. At the payee's Web site, the payee then creates a link to the acquirer for each page of information the payee wants to sell access to; embedded in each link is data needed by the acquirer to determine what information the payee wants associated with the link. The payee can have accounts with other acquirers too, but need only direct links to one of the acquirers. The acquirer to which the links are directed is called here the primary acquirer.

The dashed rectangle 23 indicates a relationship between the payer 11 and the issuer 12. Dashed rectangle 21a indicates a relationship between the payer 14 and the acquirer 15; and dashed rectangle 22 indicates a relationship between the acquirer 15 and the issuer 12.

Besides a payee having an account with more than one acquirer, there are other one-to-many relationships possible according to the present invention. As already noted, an acquirer can acquire for more than one issuer, but in addition a given issuer may use different acquirers. This is because the issuers hold accounts of the payers and the acquirers hold accounts of only the payees, so it is useful for both issuers and acquirers to have a relationship with more than one of the other.

What is likely to develop in the practice of this invention is that payers will be most numerous. Next will be payees, then acquirers, and finally issuers. So almost every payer will have an account with one or more of only a few issuers. Also, most acquirers will do business with all issuers, although it is also likely that some acquirers will choose not to do business with some of the relatively few issuers.

Completing a Pay-For Link Transaction

Still referring to FIG. 1, when a payer 11 is connected to the Web site of a payee 14 and has decided to purchase pay-per-link information from that site, the payer will click on a link to the charged-for information. If the payer has not recently made a purchase, then the payer must check in with an issuer 12 with which the payer has a relationship. The payer is not required to check in as long as the payer has an intelligent cookie with some remaining purchasing power (not stale and not fully eaten), even if the payer has never visited the Web site before. Thus, nibbles from an intelligent cookie can be taken in succession by various acquirers 15, saving the payer's issuer from participating in every purchase of a page of information, and reducing the overhead of charging for a page of information.

Check-In Procedure

Sometimes, however, a payer will need a new intelligent cookie, and then check-in is required. Check-in is caused to occur when a payer who lacks an intelligent cookie clicks on a pay-for link at a payee's Web site; this will likely happen when a payer makes the first purchase of a day. The payee's link directs the payer to a primary acquirer 15 where the payer 11 is given the option of selecting from among several issuers that cooperate with that acquirer. The primary acquirer 15 then redirects the payer's browser to the check-in page at the selected issuer 12. There the payer checks in by providing authentication, such as a user name and password. The issuer then securely issues the payer's browser an intelligent cookie, signed (authenticated) by the payer 11. This intelligent cookie represents a certain amount of purchasing power, called here an off-line credit limit, that the payer can use without having to check in again, i.e. without having to have the credit checked on-line, as part of a purchase.

Link Purchasing Procedure

Now with a payer 11 (i.e., with either a payer's browser or another computer program of a payer) still connected to an acquirer 15 (i.e., to a server), the procedure that results in providing the requested pay-per-link information to the payer is executed. This procedure is executed regardless of whether the payer had to first check in. In this link purchasing procedure, first the acquirer gets the payer's intelligent cookie from the payer's browser and verifies its signature. The acquirer retrieves the address of the target information from a pay-per-link database it keeps locally. Next the acquirer updates the intelligent cookie to reflect the purchase, in particular, deducting the cost of the information from the off-line credit limit encoded in the cookie. Then the acquirer gives the intelligent cookie to the payer's browser and directs the browser to the target information. Finally, the acquirer records the details of the transaction.

Charging The Payer

Ultimately the acquirer 15 transmits the records for usually many transactions to each issuer. Then for each transaction, an issuer 12 adjusts the payer's account, usually charging the account for information, although sometimes crediting the account for one or another reason. Then the issuer adjusts the payee's account to correspond to the adjustment to the payer's account. Next, the issuer might credit a re-seller's account if the pay-per-link transaction is the result of a referral for which the payee has agreed to compensate the referrer. The settling up between an issuer 12 and a payer 11 is completed by the issuer sending the payer a payer settlement 8, indicating the balance of the payer's account, and requesting payment for any money owed.

Paying the Payee

In the preferred embodiment, still referring to FIG. 1, for a payee 14 to get paid for purchased information, an issuer 12, after providing a payer settlement order 8 to each payer 11, determines and provides a payee settlement order 9 to the acquirer 15 of each payee 14. The payee settlement will usually be a statement of the money to be paid each payee, along with that money in some commercial form. Sometimes, however, a payee settlement order will include a statement of money owed by a payee to a payer because of, for example, a refund.

Definition of the Intelligent Cookie

Some fields included in the intelligent cookie in the preferred embodiment are shown in Table 1. In particular, the purchasing power of an intelligent cookie is indicated by the value for the field named points. Each point is, in the preferred embodiment, a tenth of a US cent, and the value for the points field indicates the current off-line credit limit of the intelligent cookie, i.e., the points that the owner of an intelligent cookie can expend without having to check-in with an issuer for authorization during a purchase. An issuer keeps an account for a payer in what is here called a credit database, containing the total points a payer has on account with the issuer. When an issuer provides a payer with a new intelligent cookie, the issuer deducts points from the account kept in the credit database, if the account is adequate, or requires the payer to make other arrangements for paying for more points.

The time field of an intelligent cookie is used by an acquirer to determine when an intelligent cookie is stale and so cannot be processed. In the preferred embodiment, if the value of the time field indicates a time more than 24 hours ago, the intelligent cookie is deemed stale. Then a payer is directed to an issuer for a new intelligent cookie according to the check-in procedure described above.

TABLE 1

Some fields of an intelligent cookie.

| Field | Description |
|---|---|
| time | timestamp, GMT in microseconds. |
| k1 | 32 hex digits (private cryptovariable) |
| k2 | 32 hex digits (private cryptovariable) |
| netcode | a string of network-derived information about the payer, his browser, his Internet connection, and other data useful for detecting fraud. |
| count | transaction number (incremented at each purchase) |
| payerid | The payer's ID number at the issuer. |
| merchid | the payee ID number of the payee who owned the paylink most recently purchased by the payer. |
| resellid | the payee ID of the payee visited just prior to merchid. |
| points | number of spending-points available for immediate on-line-spending. If this number reaches zero, then the payer will need further permission to make it positive again. (e.g. buy more points, or withdraw points from the actual credit database) |
| iddata | time\|netcode\|count\|payerid\|merchid\|resellid\|points |
| idcode | encipher(iddata,k1) (Cryptovariablek1 is used to encipher iddata.) |

In terms of the fields shown in table 1, an intelligent cookie is defined as $$intcookie = idcode | hash(idcode | k2)$$

where cryptovariable k2 is used to sign (authenticate) the idcode.

In the preferred embodiment, idcode is an encipherment, although encipherment is not necessary, but is recommended for maximum security. Any standard fast block cipher algorithm, such as RC5, can be used. Some means of providing a signature for each intelligent cookie is, however, critical to the present invention to guard against a payer altering the purchasing power of an intelligent cookie or counterfeiting. The preferred embodiment signature is based on hashing the idcode using a cryptovariable; for this, any standard fast hash algorithm, such as MD5, is adequate. In environments where guarding against payer misbehavior is less of a goal, however, an intelligent cookie can be unsigned.

By using an intelligent cookie to convey all necessary account information, an acquirer can process transactions entirely in software, and thus at high speed, since an acquirer has no immediate need to query or modify an issuer's credit database. In the preferred embodiment, to ensure long-term security, an issuer opens each day a secure communication with each acquirer and issues fresh cryptovariables k1 and k2.

Multi-Acquirer Transactions

Figure 2:
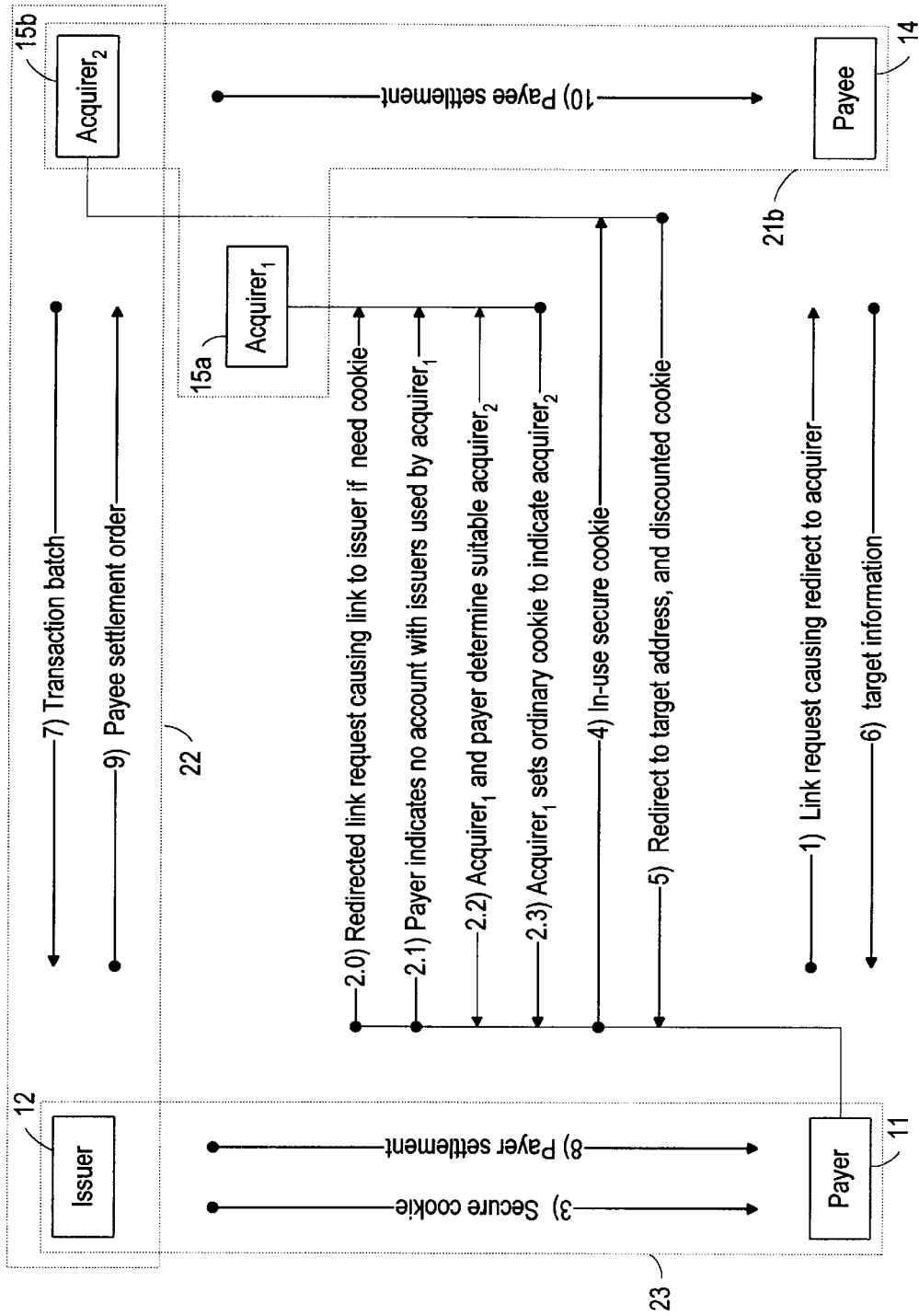
FIG. 2 is a transaction diagram for pay-per-access according to the present invention where the payer does not have an account with an issuer the acquirer uses.

Referring now to FIG. 2, when a payer 11 wants to purchase links from a payee 14 but the payee's links point to a primary acquirer 15a that does not cooperate with the payer's issuer 12, the payee's primary acquirer can offer to redirect transactions to a secondary acquirer 15b that does cooperate with the payer's issuer.

When such a payer 11 first attempts to purchase a link from a payee 14, the payee's primary acquirer 15a will be unable to process the transaction and will send the payer 11 to a Web page that gives the payer an opportunity to indicate an issuer 12 the payer uses. Then the primary acquirer 15a will give to the payer's browser an ordinary cookie, as opposed to an intelligent cookie, that identifies the secondary acquirer 15b. Next the primary acquirer 15a will redirect the payer's browser 11 to the secondary acquirer 15b. With this arrangement, each time a payer 11 attempts to purchase a link from a payee 14 who uses a primary acquirer 15a not affiliated with the payer's issuer 12, the primary acquirer 15a will see the redirecting cookie and redirect the link request to the secondary acquirer 15b.

In FIG. 2, the dashed rectangle 23 indicates a relationship between the payer 11 and the issuer 12. Dashed rectangle 21b indicates a relationship between the payer 14 and the primary acquirer 15a, and between the payer 14 and the secondary acquirer 15b; and dashed rectangle 22 indicates a relationship between the acquirer 15 and the issuer 12.

FIG. 2 indicates that, in the present invention, when a primary acquirer 15a must redirect requests to a secondary acquirer 15b, a protocol is used that is nearly the same as the protocol used in the case of a single acquirer. The protocols differ only in that in the multi-acquirer case, of those communications numbered 4 and higher that involve an acquirer, the secondary acquirer is involved; in addition, there are some further communications 2.1–2.3 not needed in the single-acquirer protocol.

Enabling Pay-Per-Links at a Payee's Web Page

Although there are many possible methods by which an acquirer can determine to what address on the network—called here a target address—to redirect a payer to access paid-for information, in the preferred embodiment an acquirer uses a link reference page, described below. More generally, however, a payee provides target addresses to an acquirer in advance; then the payee and acquirer agree on a public, indirect reference to the target information. The public reference may be simply some alias, i.e. a name, not an actual network address. Such a public reference is embedded in a pay-for link at the payee's site, and links a payer to the acquirer, who then translates the public reference into an actual network address, the target address. Then, after collecting payment using the payer's intelligent cookie, the acquirer redirects the payer to the target information using the target address.

The Link Reference Page—A Pre-Compiled Database

In the preferred embodiment, after establishing an account with an acquirer, a payee specifies, on a secret page called here a link reference page and stored at the acquirer's Web site, the address of each pay-per-link page of information for which the payee offers a pay-for link at the payee's Web site. Thus, the link reference page, which is therefore a pre-compiled database of the pay-per-link pages of the payee, holds the actual network address—the target address—of each pay-per-link page of information to which the payee sells access. The acquirer uses the link reference page when a payer clicks on a pay-for link at a payee's Web site indicating information he wants to purchase; then the acquirer refers to the link reference page to determine the target address to which to redirect the payer.

The (secret) link reference page is represented in a standard format that for each link specifies parameters the payee wants to associate with the link. As shown in table 2, in the preferred embodiment, the link reference page will include as parameters at least a cost for each target address/alias mapping. In the preferred embodiment, besides a cost, a link reference page could include as parameters for a link a reseller, a resell percentage, and a content warning.

TABLE 2

Tabular display of a link reference page with only cost as a parameter for each target address/ alias mapping.

| Alias | Cost | URL (target address) |
| --- | --- | --- |
| Daily News | Cost = 80 | URL = payeewebsite/dly.html |
| Sports | Cost = 125 | URL = payeewebsite/spr.html |
| Picture1 | Cost = 52 | URL = payeewebsite/pix/tree.jpg |
| Picture2 | Cost = 55 | URL = payeewebsite/puppies.gif |
| Picture3 | Cost = 36 | URL = otherwebsite/photos/33.gif |

Syntax for Links to a Target Page

A pay-for link at a payee's Web site, which is intended ultimately to direct a payer to a pay-per-link page, first directs the payer to the payee's acquirer. Embedded in each pay-for link are at least two data fields: a payee identification, and the same alias for the target that is used on the link reference page. A pay-for link at a payee's Web site might be constructed as:

AcquirerWebsite/link?payee=980234&link=picture3

With this link, a payer would first be linked to the acquirer at www.acquirer.com; then the acquirer would direct the payer to a pay-per-link page with alias "picture3" at a cost of 36 points.

Updating a Link Reference Page

In the preferred embodiment, each payee keeps a copy of the payee's link reference page information to update as desired. To change the payee's link reference page information held by the acquirer, a payee simply embeds a refresh command in an appropriate pay-for link. This prompts the acquirer to retrieve the amended payee's link reference page information at the payee's web site.

It is to be understood that the above-described arrangements are only illustrative of the application of the principles of the present invention. In particular, the present invention is not restricted to using an intelligent cookie with a payer's browser. The present invention encompasses using an intelligent cookie stored anywhere on a payer's computer, allowing pay-per-link information access without the usual browser human interface. Numerous other modifications and alternative arrangements may be devised by those skilled in the art without departing from the spirit and scope of the present invention, and the appended claims are intended to cover such modifications and arrangements.

What is claimed is:

1. A method of charging a payer for access, over a network, to at least one target page of information offered by a payee, comprising the steps of:
   (1) having an issuer issue an intelligent cookie to the payer so as to allow the payer to pay for the target page, the intelligent cookie being implemented as a persistent data object and conveying a current purchasing power;
   (2) having an acquirer reduce the purchasing power of the intelligent cookie by the cost of access to the target page after the payer exercises a pay-for link associated with the target page, the pay-for link for linking the payer to the acquirer and for passing an alias to the acquirer that identifies to the acquirer the target page location on the network by serving as an index into a secret means of cross-referencing aliases, used by the payee, to actual network addresses of pages of information to which the payee offers access, the means of cross-referencing being provided by the payee to the acquirer and maintained by the acquirer, the acquirer redirecting the payer to the target page based upon said alias in association with said cross-reference information mapping said alias to the target page;

wherein the intelligent cookie is a dynamic data object, not modifiable by a payer, but modifiable by the acquirer, and further wherein the alias to the target information does not by itself disclose the target information but must be used in combination with the means of cross-referencing the alias, which is made available by the payee only to the acquirer.

2. A method as claimed in claim 1, further comprising, before step (1), the step in which the acquirer checks to see if the payer has an intelligent cookie with sufficient purchasing power to purchase access to the associated information, and if not, the acquirer directs the payer to check in with the issuer to secure an intelligent cookie with sufficient purchasing power.

3. A method as claimed in claim 1, wherein the payer exercises a pay-for link through a human interface in which the payer clicks on the pay-for link.

4. A method as claimed in claim 1, wherein the payer uses an autonomous information search and retrieval engine to exercise a pay-for link.

5. A method as claimed in claim 1, wherein the network is the Internet, and wherein the payer, payee, and acquirer interface over the World Wide Web, and further wherein the actual network address of a page of information is the uniform resource locator (URL) of the page of information.

6. A method as claimed in claim 1, wherein the primary acquirer sets an ordinary cookie in the payer's computer indicating that all links by the payer are to be redirected to another acquirer.

7. A method as claimed in claim 1, wherein the cross-reference information includes a reseller identification and a reseller percentage, and wherein whenever the payer or payer agent exercises the payee's pay-for link the acquirer compensates the identified reseller according to the reseller percentage.

8. A method as claimed in claim 1, wherein the cross-reference information includes a reseller percentage, wherein the intelligent cookie includes a reseller identification, and wherein whenever the payer or payer agent exercises the payee's pay-for link the acquirer compensates the identified reseller according to the reseller percentage.

9. The method as claimed in claim 1, wherein the intelligent cookie further conveys as data fields:
   a field variable indicating a timestamp;
   a field variable indicating information about the payer, the payer's browser, and the payer's network connection;
   a transaction number;
   a field having a value for identifying the payer to the issuer; and
   a field having a value for identifying the payee who owns the paylink most recently purchased by the payer.

10. The method as claimed in claim 9, wherein the intelligent cookie is formed in the following steps:
   (1) concatenating all the data fields to provide a concatenated data field iddata;
   (2) enciphering iddata using a first cryptovariable k1 to provide an enciphered data object idcode;
   (3) performing a hash of idcode using a second cryptovariable k2 and concatenating the result with idcode, according to: idcode|hash(idcode|k2);
   wherein cryptovariable k2 is used to authenticate idcode.

11. A method of charging a payer for access, over a network, to at least one target page of information offered by a payee, comprising the steps of:
   (1) having an issuer issue a purchasing power to the payer so as to allow the payer to pay for the target page;
   (2) having an acquirer reduce the purchasing power by the cost of access to the target page after the payer exercises a pay-for link associated with the target page, the pay-for link for linking the payer to the acquirer and for passing to the acquirer an index into a secret means of cross-referencing such indices, created by the payee, to actual network addresses of pages of information to which the payee offers access, the means of cross-referencing being provided by the payee to the acquirer and maintained by the acquirer in such a way as to be associated with the payee, the acquirer redirecting the payer to the target page based upon using said index to determine an actual address of the target page;
   wherein the purchasing power is a data object encoded so as not to be modifiable by a payer.

* * * * *

UNITED STATES PATENT AND TRADEMARK OFFICE
CERTIFICATE OF CORRECTION

PATENT NO. : 6,157,917            Page 1 of 1
DATED : December 5, 2000
INVENTOR(S) : Timothy P. Barber It is certified that error appears in the above-identified patent and that said Letters Patent is hereby corrected as shown below:

Title page,
Item [56], References Cited U.S. PATENT DOCUMENTS "5,708,780 1/1998 Levergood et al. .......... 709/229" should read -- 5,708,780 1/1998 Levergood et al. ............... 395/200.12 --
"5,724,424 3/1998 Gifford ............ 705/70" should read -- 5,724,424 3/1998 Gifford ............... 380/24

Signed and Sealed this

Eighteenth Day of September, 2001

Attest:

NICHOLAS P. GODICI
Attesting Officer     Acting Director of the United States Patent and Trademark Office